(12) United States Patent
Bray (10) Patent No.: US 10,479,283 B2
(45) Date of Patent: Nov. 19, 2019

(54) RACK ASSEMBLY FOR MOWER

(71) Applicant: Vernon Bray, Loudon, TN (US)

(72) Inventor: Vernon Bray, Loudon, TN (US)

( * ) Notice: Subject to any disclaimer, the term of this patent is extended or adjusted under 35 U.S.C. 154(b) by 0 days.

(21) Appl. No.: 15/866,030

(22) Filed: Jan. 9, 2018

(65) Prior Publication Data

US 2018/0208124 A1   Jul. 26, 2018

Related U.S. Application Data

(60) Provisional application No. 62/449,384, filed on Jan. 23, 2017.

(51) Int. Cl.
*B60R 9/06* (2006.01)
*A01D 75/00* (2006.01)

(52) U.S. Cl.
CPC .............. *B60R 9/06* (2013.01); *A01D 75/008* (2013.01)

(58) Field of Classification Search
CPC .. B60R 9/06; B60R 9/065; B60R 9/08; B60R 9/10; A01D 75/008
USPC ........................................................ 224/410
See application file for complete search history.

(56) References Cited

U.S. PATENT DOCUMENTS

| | | | |
|---|---|---|---|
| 2,442,889 A * | 6/1948 | Deal | B62D 49/065 |
| | | | 224/410 |
| 3,913,811 A | 10/1975 | Spencer | |
| 4,234,284 A | 11/1980 | Hauff | |
| 4,915,276 A | 4/1990 | Devito | |
| 4,922,696 A | 5/1990 | Burns | |
| 5,033,662 A | 7/1991 | Godin | |
| 5,056,695 A | 10/1991 | Giblet | |
| 5,067,640 A | 11/1991 | Gaskill | |
| 5,080,442 A | 1/1992 | Doering | |
| 5,205,700 A | 4/1993 | Lin | |
| 5,224,636 A | 7/1993 | Bounds | |
| 5,433,357 A | 7/1995 | Alliff | |
| 5,480,180 A | 1/1996 | Fuller | |
| 5,586,702 A | 12/1996 | Sadler | |
| 5,680,976 A | 10/1997 | Kopliopoulos | |
| 5,712,248 A | 1/1998 | Kalman et al. | |
| 5,826,768 A * | 10/1998 | Gamulo | B60R 9/06 |
| | | | 224/486 |
| 5,938,395 A | 8/1999 | Dumont, Jr. | |
| D432,488 S | 10/2000 | Roll | |
| D436,575 S | 1/2001 | McCoy | |
| 6,186,729 B1 | 2/2001 | Sargent | |
| D445,757 S | 7/2001 | Adams | |
| 6,513,690 B1 | 2/2003 | Churchill | |
| 6,595,397 B2 | 7/2003 | Teich | |
| 6,663,328 B2 | 12/2003 | Schmidt | |

(Continued)

FOREIGN PATENT DOCUMENTS

| | | |
|---|---|---|
| EP | 37599 | 10/1981 |
| GB | 2203397 | 10/1988 |

*Primary Examiner* — Derek J Battisti
(74) *Attorney, Agent, or Firm* — Pitts & Lake, P.C.

(57) ABSTRACT

A rack assembly to be selectively coupled to a riding lawn mower, the rack assembly including a rack configured to have a forward and a rearward edge, one or more support members configured to extend forward from the rack proximate the forward edge and to be at least partially received in a riding lawn mower frame, a stability support configured to extend downward and forward from the rack proximate the rearward edge and to rest upon a trailer hitch mechanism of the riding lawn mower frame.

16 Claims, 5 Drawing Sheets

(56) References Cited

U.S. PATENT DOCUMENTS

| | | |
|---|---|---|
| D505,106 S | 5/2005 | Kuseske |
| 6,948,732 B2 | 9/2005 | Amacker |
| 7,293,951 B2 * | 11/2007 | Meeks ................. B60P 1/4407 414/462 |
| 7,334,713 B1 * | 2/2008 | Turner ..................... B60R 9/00 224/401 |
| 7,780,394 B1 | 8/2010 | Becker |
| 8,146,786 B2 | 4/2012 | Cheung |
| 8,556,145 B1 | 10/2013 | Ezra |
| 8,561,960 B2 * | 10/2013 | Sinclair .............. B62D 33/0621 135/88.08 |
| 9,027,809 B1 | 5/2015 | Ezra |
| 9,089,728 B2 | 7/2015 | Halley |
| D772,782 S * | 11/2016 | Johnson ...................... D12/412 |
| 9,744,911 B2 * | 8/2017 | Mobley .................... B60R 9/06 |
| 2003/0111501 A1 * | 6/2003 | McGraw .................. B60G 9/00 224/410 |
| 2003/0155390 A1 | 8/2003 | Williams |
| 2004/0124508 A1 | 7/2004 | McCoy |
| 2006/0104767 A1 * | 5/2006 | Dugger .................... B60R 9/06 414/462 |
| 2009/0014488 A1 | 1/2009 | Ayers |
| 2012/0325876 A1 * | 12/2012 | Hill .......................... B60R 9/06 224/401 |
| 2013/0076015 A1 * | 3/2013 | Lovett ...................... B60R 9/06 280/769 |
| 2013/0255113 A1 | 10/2013 | Carroll |
| 2015/0156943 A1 | 5/2015 | Bair |

* cited by examiner

RACK ASSEMBLY FOR MOWER

CROSS-REFERENCE TO RELATED APPLICATIONS

This application claims the benefit of U.S. Provisional Patent Application Ser. No. 62/449,384, filed on Jan. 23, 2017, which is incorporated herein in its entirety by reference.

STATEMENT REGARDING FEDERALLY SPONSORED RESEARCH OR DEVELOPMENT

Not Applicable.

FIELD OF INVENTION

The present invention pertains generally to a rack assembly, and, more particularly, to a rack assembly that may be mounted on a riding lawn mower.

BACKGROUND

It is becoming increasingly common for homeowners to own utility vehicles to aid in various chores and personal work projects. These utility vehicles are typically small and relatively low powered transports that include rack storage for transporting heavy or numerous items from to various points on the homeowner's property. However, even with the smaller scale in overall size and power built into such utility vehicles, owning such a vehicle may still be cost-prohibitive for many people. On the other hand, many more people own riding lawn mowers which are handy mobile vehicles but are typically designed simply for mowing. Conventional riding lawn mowers typically may include a trailer hitch for hauling another wheeled vehicle behind the mower, but do not have convenient storage space or capacity for hauling items on the lawn mower itself. Therefore, it may be desirable to provide such a riding lawn mower with an apparatus to enhance the utility of the lawn mower.

BRIEF SUMMARY

According to various example embodiments of the present general inventive concept, a selectively mountable rack assembly is provided to be used with a riding lawn mower or other vehicle.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by a rack assembly to be selectively coupled to a riding lawn mower, the rack assembly including a rack configured to have a forward and a rearward edge, one or more support members configured to extend forward from the rack proximate the forward edge and to be at least partially received in a riding lawn mower frame, a stability support configured to extend downward and forward from the rack proximate the rearward edge and to rest upon a trailer hitch mechanism of the riding lawn mower frame.

The foregoing and/or other aspects and advantages of the present general inventive concept may also be achieved by a rack assembly for a riding lawn mower having recesses in the frame on opposite sides of the seat and a trailer hitch mechanism, the rack assembly including a rack having a substantially flat floor for carrying items, the rack having a forward edge and a rearward edge, a pair of mounting pins carried proximate opposite ends of the forward edge of the rack, each of the mounting pins extending downwardly and spaced to register with and be received by a cooperating recess in the frame, and a stability support extending downwardly from the rearward edge of the rack and angled towards the forward edge thereof, the stability support terminating in a cross member that rests on the trailer hitch mechanism of the mower.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a selectively mountable rack assembly is provided to be used with a riding lawn mower. One type of riding lawn mower to which the rack assembly may be coupled is a John Deere® riding lawn mower. It is noted that the selectively mountable rack assembly may also be mounted on certain other types of vehicles than riding lawn mowers, including vehicles which may or may not be previously configured in such a way as to facilitate the mounting of the rack assembly in the manner described herein in relation to several of the example embodiments and/or illustrations. The rack assembly may be easily and quickly coupled or decoupled from the riding lawn mower according to the user's wishes.

In various example embodiments of the present general inventive concept, a rack assembly may be provided for a riding lawn mower having recesses in the lawn mower frame on opposite sides of the seat above a trailer hitch. The rack assembly may include a rack which is provided with a substantially flat floor for carrying various items such as tools, fertilizer, gardening soil, livestock feed, etc. A pair of mounting pins may be provided to the rack and spaced apart and designed to register with, and be received by, cooperating recesses in the frame of the mower. A stability support extending downwardly from the rearward edge of the rack may be angled toward the forward edge so as to terminate in a cross member that rests on a trailer hitch of the lawn mower to provide further support of items carried by the rack.

Figure 1:
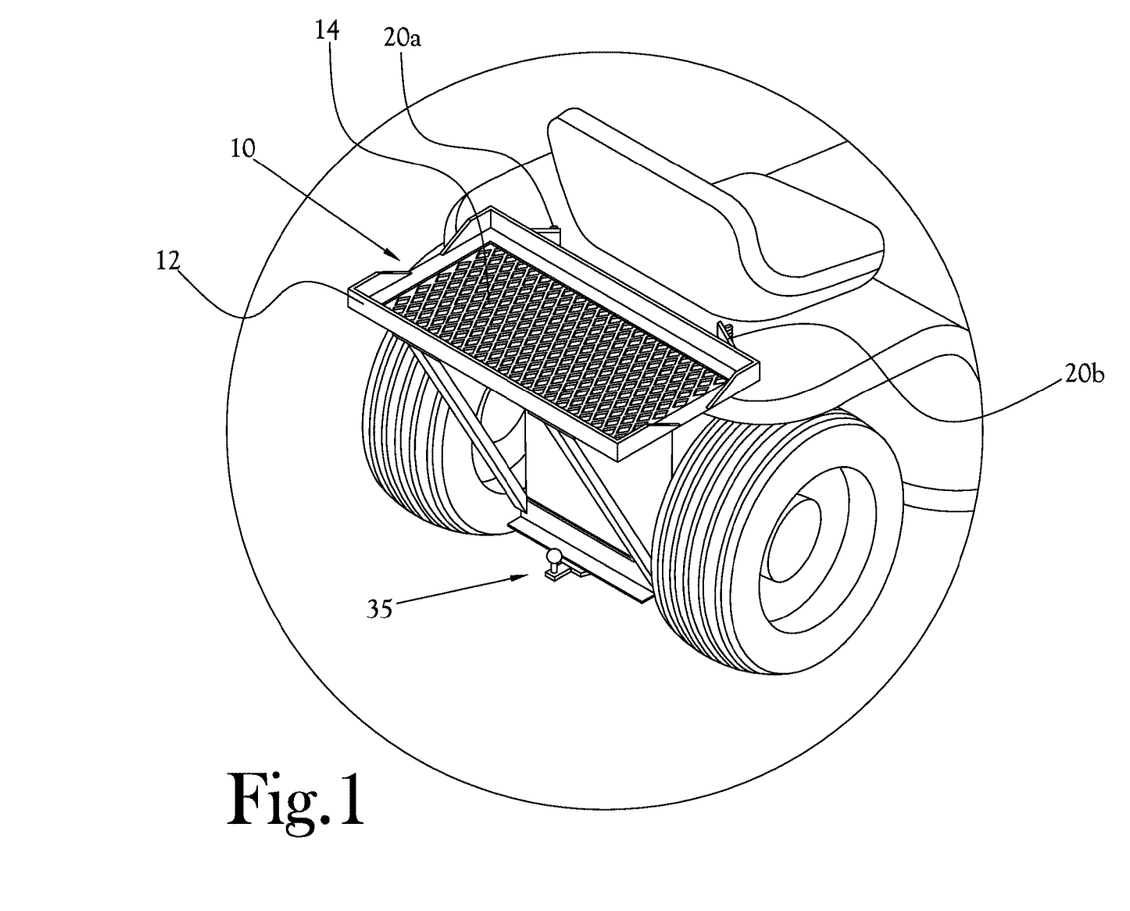
FIG. 1 illustrates a rack assembly coupled to a typical riding lawn mower according to an example embodiment of the present general inventive concept.

FIG. 1 illustrates a rack assembly coupled to a typical riding lawn mower according to an example embodiment of the present general inventive concept. With such a rack assembly affixed to a riding lawn mower, the mower may be used for carrying a host of items such as hay bales, grass seed, gardening tools, a tank sprayer, or the like routinely used in yard or garden maintenance. As illustrated in FIG. 1, the rack assembly 10 according to this example embodiment includes a rack 12 having a substantially flat floor 14 upon which items to be carried can be placed. It will be noted that the rack 12 in the illustrated example embodiment is provided with a rectangular frame that supports the floor 14 to provide strength and stability thereto. The rack 12 illustrated in the example embodiment of FIG. 1 has raised edges around the perimeter of most of the flat floor 14 to inhibit items carried on the rack 12 from sliding off. In various example embodiments, there may be recesses, such as those shown in the middle of the raised edges located at opposite ends of the flat floor 14, to provide improved access to a user to add or remove items from the rack 12. In various example embodiments, one or more of the raised edges may be hinged so as to be lowered during a loading or unloading operation. The example embodiment of the rack assembly 10 illustrated in FIG. 1 is configured so as be coupled to the riding lawn mower at a pair of recesses 20a,20b which may receive coupling members provided to the rack assembly 10, and which will be discussed in more detail in the description of FIG. 2. The rack assembly 10 is also given support by frame portions extending downward to rest on a trailer hitch mechanism 35 of the riding lawnmower, which will also be discussed in more detail in the description of FIG. 2.

Figure 2:
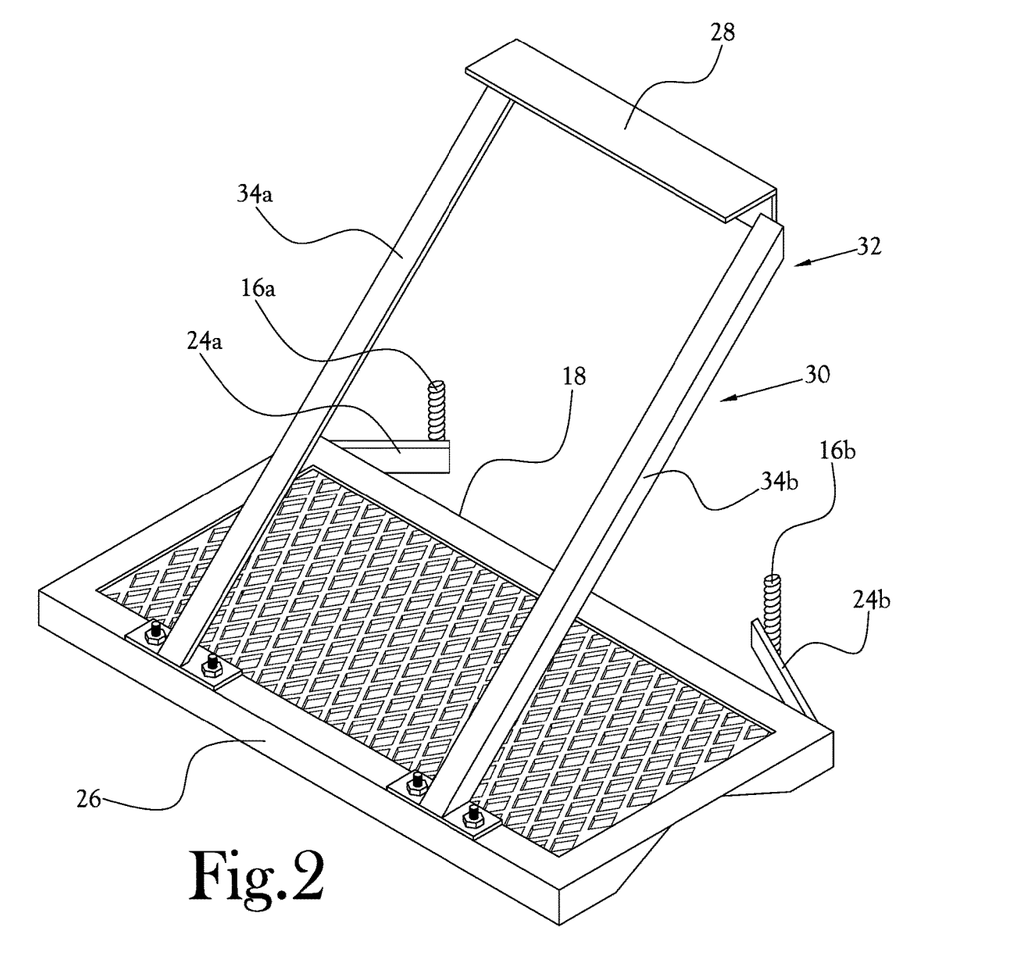
FIG. 2 illustrates an elevation view of the rack assembly of FIG. 1.

FIG. 2 illustrates an elevation view of the rack assembly 10 of FIG. 1 in which the rack assembly 10 is not coupled to the riding lawn mower. As illustrated in FIG. 2, a pair of support members 24a,24b extend from proximate opposite ends of a forward edge 18 of the rack 12. A pair of coupling members may be provided to the support members 24a,24b so as to couple the rack assembly 10 to the riding lawn mower. In the example embodiment illustrated in FIG. 2, a pair of mounting pins 16a,16b are respectively provided proximate ends of the support members 24a,24b, and are configured so as to register and be received by the aforementioned recesses 20a,20b of the riding lawn mower. In various example embodiments of the present general inventive concept, the mounting pins 16a,16b may be permanently affixed proximate the ends of the support members 24a,24b, and in other various example embodiments the mounting pins 16a,16b may be selectively detachable so as to allow a user to easily replace the mounting pins 16a,16b or employ different types of coupling members for different types of coupling structures on the riding lawn mower. Also, various example embodiments of the present general inventive concept may include support members 24a,24b that are hinged at the connection point to the rack 12, or at a point along the support members 24a,24b to provide a range of movement to vary the placement of the mounting pins 16a,16b or other coupling members to accommodate different configurations of coupling opportunities for various different riding lawn mowers or similar vehicles. In the example embodiment illustrated in FIG. 2, the support members 24a,24b are fixed at a predetermined configuration to provide proper spacing so that the mounting pins 16a,16b register with recesses 20a,20b of a predetermined riding lawn mower frame configuration. In the example embodiment illustrated in FIG. 2, the mounting pins 16a,16b extend downwardly to be easily received by the recesses 20a,20b of the riding lawn mower. With such a configuration, the rack assembly 10 may simply be lifted up and out of the recesses 20a,20b to remove the rack assembly 10 from the riding lawn mower. In various other example embodiments, securing members such as threaded nuts or the like may be provided to the mounting pins 16a,16b to provide a more secure connection. In other various example embodiments, the mounting pins 16a,16b may be configured to be received in a slip fit fashion in the recesses of the riding lawn mower.

As illustrated in FIGS. 1-2, the forward edge 18 of the rack 12 is supported by the lawn mower frame, and the rearward edge 26 of the rack 12 is supported by a stability support 30 that extends downward below the rack to rest on the trailer hitch mechanism 35. In this example embodiment, the stability support 30 includes a pair of frame members 34a,34b extending downwardly from the rearward edge 26 of the rack 12, and angled forward toward the riding lawn mower. A cross member 28 is provided at end portions 32 of the frame members 34a,34b to provide a surface extending between the frame members 34a,34b that is configured to rest on the trailer hitch mechanism 35. In this example embodiment, the cross member 28 is configured to have a flat surface to rest flush on a flat upper portion of the trailer hitch mechanism 35. In various example embodiments, the cross member 28 may be pivotably coupled to the frame members 34a,34b such that the cross member 28 is rotatable to rest flat on the trailer hitch mechanism 35. In various example embodiments, one or more coupling members may be provided proximate a center portion of the cross member 28 to provide a more secure connection to the trailer hitch mechanism 35, to inhibit bouncing or other types of unwanted movement of the rack assembly 10 that may be caused by operating the riding lawn mower over rough terrain.

Figure 3:
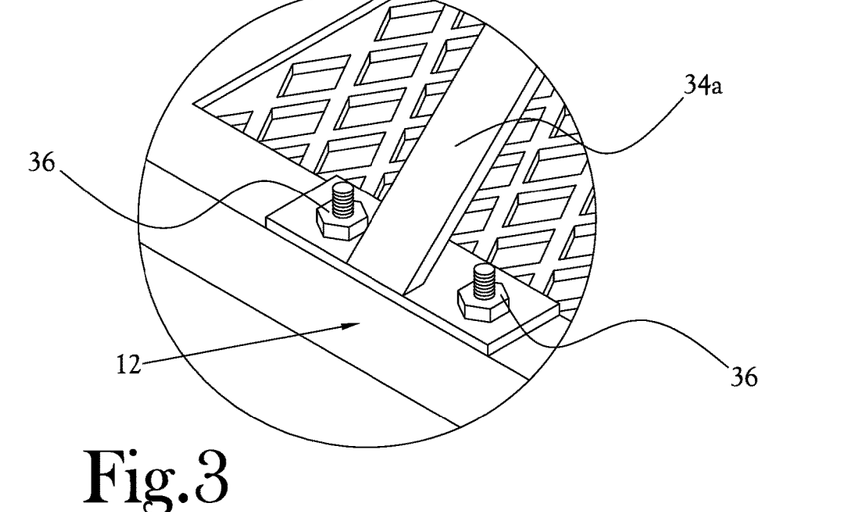
FIG. 3 illustrates a portion of the rack assembly of FIG. 1 in which frame members of a stability support are secured to the rack assembly frame.
Figure 4:
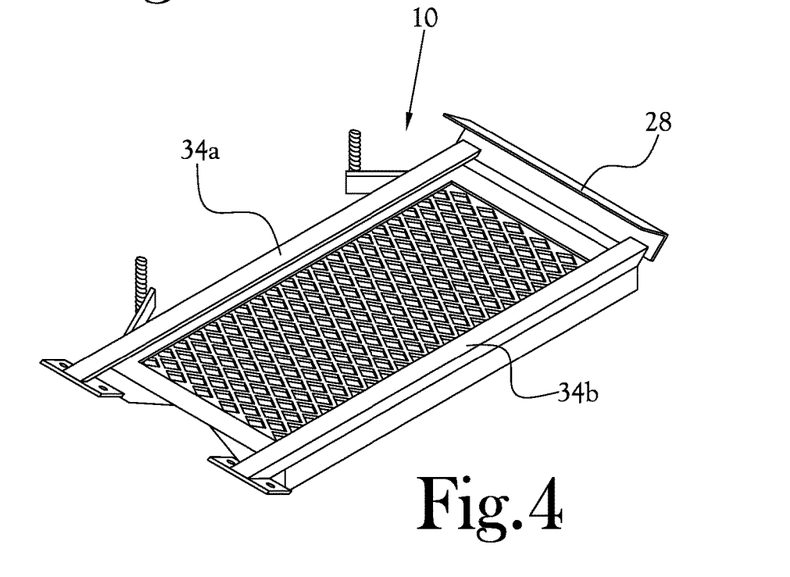
FIG. 4 illustrates a view of the rack assembly of FIG. 1 in a collapsed position for shipping or storage.

FIG. 3 illustrates a portion of the rack assembly of FIG. 1 in which frame members of a stability support are secured to the rack assembly frame. As illustrated in FIG. 3, the frame members 34a,34b may be coupled to the rack 12 by a selectively coupled arrangement such as bolt and nut 36 arrangement so that the rack assembly 10 may be disassembled so as to be transported or stored in a smaller space than would be needed when fully assembled. FIG. 4 illustrates a view of the rack assembly of FIG. 1 in a collapsed position for shipping or storage. As illustrated in FIG. 4, the frame members 34a,34b have been detached from the rack 12 and laid flat upon the rest of the rack assembly 10. In this example embodiment, the cross member 28 remains attached to the frame members 34a,34b to maintain an overall assembled portion of the stability support 30, and to allow for quick and easy re-assembly.

Figure 5:
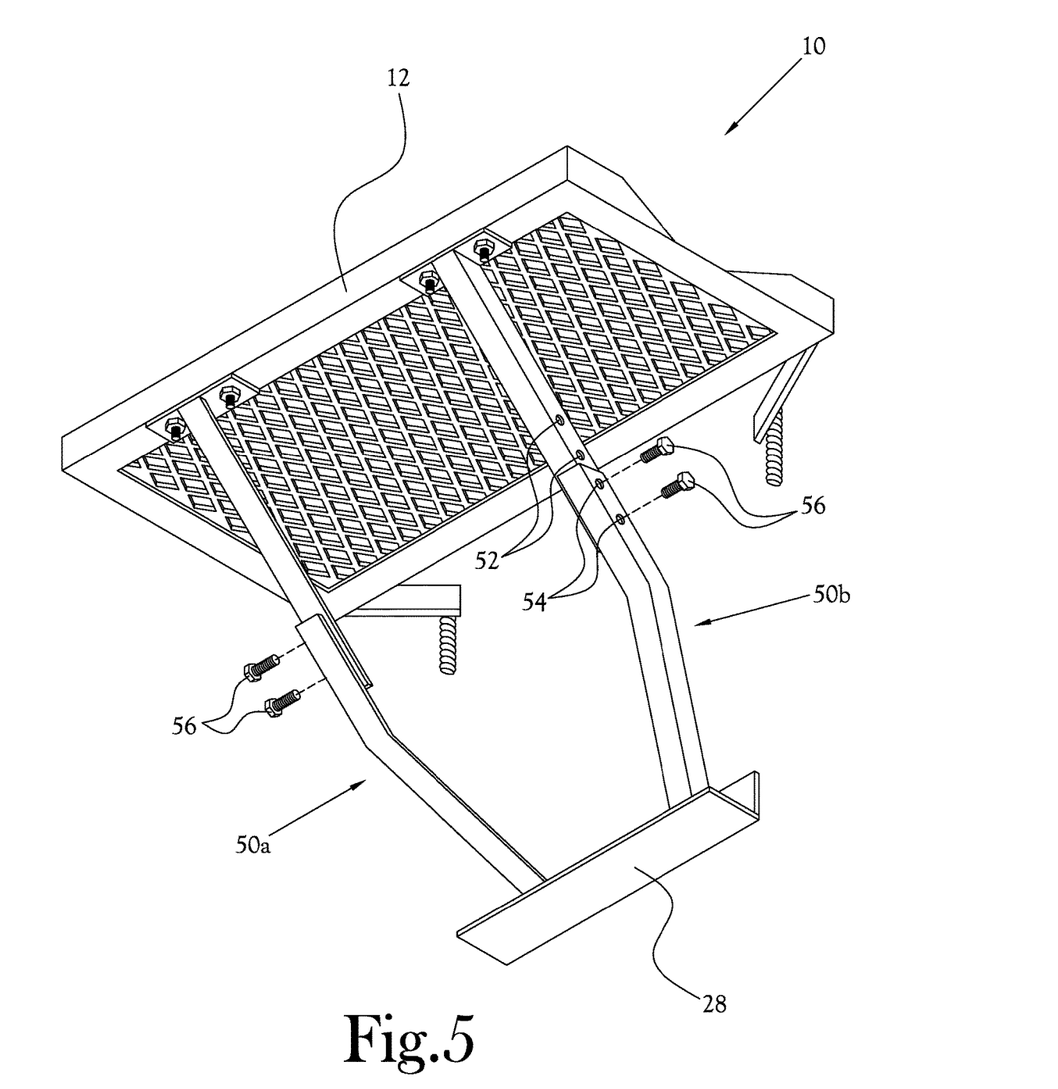
FIG. 5 illustrates a rack assembly having adjustable frame members according to another example embodiment of the present general inventive concept.
Figure 6:
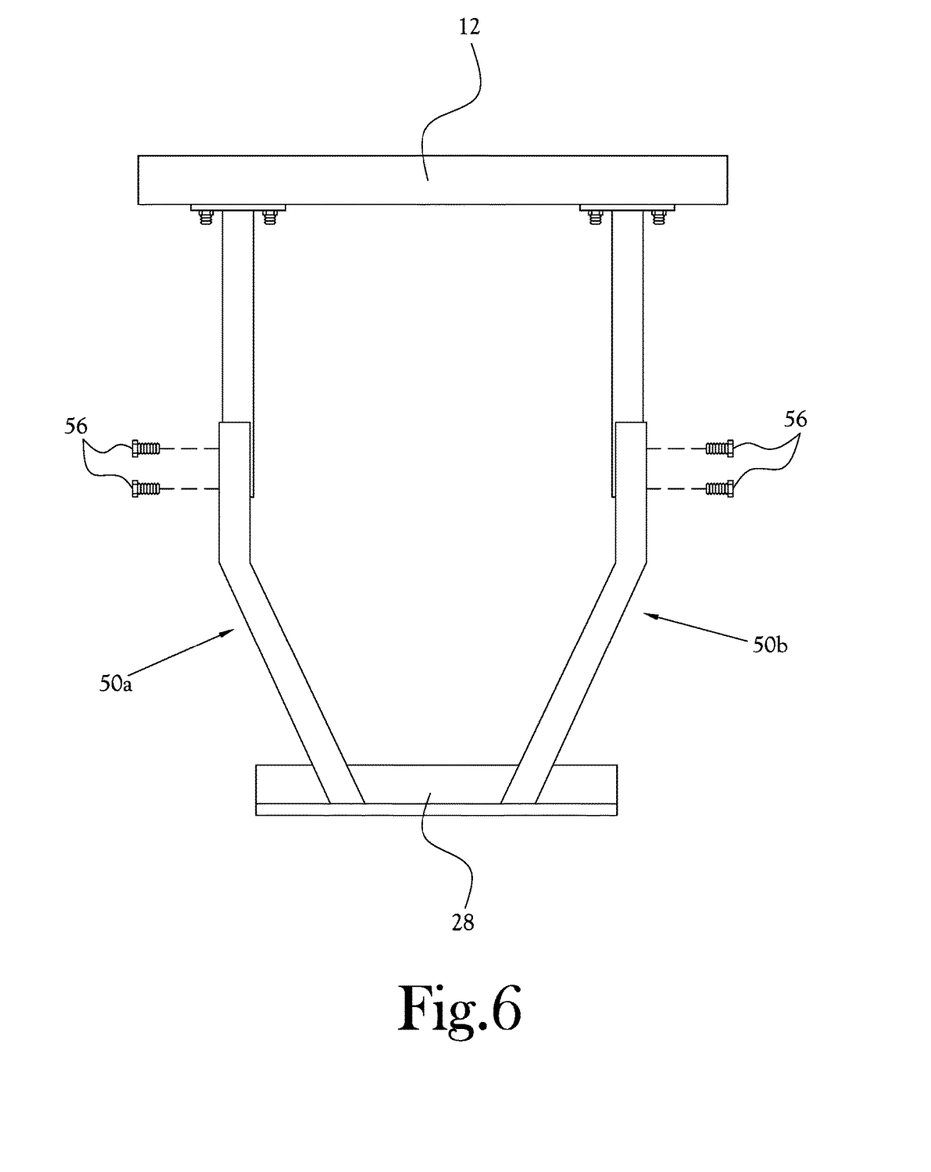
FIG. 6 illustrates a front elevation view of the rack assembly of FIG. 5.

FIG. 5 illustrates a rack assembly having adjustable frame members according to another example embodiment of the present general inventive concept, and FIG. 6 illustrates a front elevation view of the rack assembly of FIG. 5. In the example embodiment illustrated in FIGS. 5-6, the rack assembly 10 has much the same configuration as the example embodiment illustrated in FIGS. 1-4, except stability support has been provided with adjustable length frame members 50a,50b so that the height of the cross member 28 may be adjusted to fit different needs relative to the trailer hitch mechanism of the riding lawn mower. Each of the frame members 50a,50b are formed in two parts in which a plurality of through holes 52 are provided in the upper portions of the frame members 50a,50b so as to register with one or more corresponding through holes 54 provided in the lower portions of the frame members 50a, 50b such that the overall length of the frame members 50a,50b may be adjusted by lining up the desired through holes 52,54 so as to receive a bolt or screw 56 to secure the frame members 50a,50b at the desired length. As the frame members 50a,50b can be adjusted in length, a user can secure a more effective length for the stability support that is desired for proper mounting of the rack assembly 10 on the riding lawn mower. Similarly, although not illustrated, in various example embodiments of the present general inventive concept the support members 24a,24b may be formed so as to have adjustable lengths in the same manner as the frame members 50a,50b of FIGS. 5-6, and may also be coupled to the forward edge 18 of the rack 12 in a hinged manner as previously described, to provide a broader range of coupling configurations to the rack assembly 10.

Although the flat floor 14 of the rack 12 is illustrated as a grate that is integrated with the rack 12 in the illustrated example embodiments described herein, various example embodiments of the present general inventive concept may be provided with floors of different forms and/or materials. For example, the flat floor 14 may be provided of a solid material which does not allow fluids or other materials to pass through. In other various example embodiments the floor of the rack may be made of a pliable and/or elastic material which will provide a softer and/or expandable bottom of the rack 12. In various example embodiments of the present general inventive concept, the rack may be configured so as to have selectively interchangeable floors so that a user may install different types of rack floors for different types of jobs. In various example embodiments of the present general inventive concept, the rack may be provided with a selectively removable cover, which may be coupled to the rack in a pivoting fashion for easy access to materials in the rack located under the cover.

It is noted that while the example embodiments illustrated herein discuss a rack assembly coupled to a riding lawn mower, the rack assembly may be used in different manners with different types of vehicles. For example, because of the configuration of the mounting pins 16a,16b, the rack assembly could be placed on a tailgate of a pickup truck, with the mounting pins 16a,16b providing support from an upper and inner area of the closed tailgate of the truck, and the cross member 28 extending downward proximate the bumper of the trailer hitch of the truck.

Various example embodiments of the present general inventive concept provide a rack assembly to be selectively coupled to a riding lawn mower, the rack assembly including a rack configured to have a forward and a rearward edge, one or more support members configured to extend forward from the rack proximate the forward edge and to be at least partially received in a riding lawn mower frame, a stability support configured to extend downward and forward from the rack proximate the rearward edge and to rest upon a trailer hitch mechanism of the riding lawn mower frame. The one or more support members may include two support members extending from the rack proximate opposite ends of the forward edge. The rack assembly may further include at least one coupling member configured to extend from each respective support member so as to selectively couple the rack assembly to the riding lawn mower frame by being received in recesses of the lawn mower frame. Each of the one or more support members may be configured in two selectively coupled portions such that a length of the one or more support members is adjustable. Each of the one or more support members may include a securing member to secure the length of the one or more support members. The securing member of the one or more support members may include a bolt and nut assembly. The one or more support members may be configured to be pivotably coupled to the rack such that an angle from which the one or more support members extend from the rack is adjustable. The stability support may include two frame members configured to extend from the rearward edge of the rack, and a cross member configured to connect ends of the two frame members opposite the rearward edge of the rack, wherein the cross member is configured with a flat portion to rest upon the trailer hitch mechanism of the riding lawn mower frame. The two frame members may be configured to be selectively detachable from the rack. The two frame members may be configured to be attached to the rack by a nut and bolt assembly. The two frame members may be configured to be pivotably coupled to the rack such that a height of the cross member is adjustable relative to the rack. The rack cross member may be configured to be pivotably coupled to the frame members such that the cross member is rotatable to rest flat on the trailer hitch mechanism. Each of the frame members may be configured in two selectively coupled portions such that a length of the frame members is adjustable. Each of the frame members may include a securing member to secure the length of the one or more support members. The securing member of the frame members may include a bolt and nut assembly. Each of the portions of each frame member may be configured with through holes formed to register with through holes of a corresponding portion such that a preferred length of the frame member may be secured by a bolt received by through holes in register. The rack assembly may further include a selectively detachable floor provided to the rack.

Various example embodiments of the present general inventive concept provide a rack assembly for a riding lawn mower having recesses in the frame on opposite sides of the seat and a trailer hitch mechanism, the rack assembly including a rack having a substantially flat floor for carrying items, the rack having a forward edge and a rearward edge, a pair of mounting pins carried proximate opposite ends of the forward edge of the rack, each of the mounting pins extending downwardly and spaced to register with and be received by a cooperating recess in the frame, and a stability support extending downwardly from the rearward edge of the rack and angled towards the forward edge thereof, the stability support terminating in a cross member that rests on the trailer hitch mechanism of the mower. The stability support may include a pair of spaced frame members, each of the frame members being connected at its upper end to the rearward edge of the rack, and each of the frame members being connected at its lower end to the cross member which rests on the trailer hitch mechanism of the mower when the rack is mounted thereon. Each of the frame members may be configured to be adjusted in its length dimension to accommodate differences between the spacing of the rearward edge of the rack and the trailer hitch mechanism.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A rack assembly to be selectively coupled to a riding lawn mower, the rack assembly comprising: a rack configured to have a forward and a rearward edge; one or more support members configured to extend forward from the rack proximate the forward edges and having coupling members respectively fixed proximate distal ends of the one or more support members and configured to extend downward to be at least partially received in recesses of a riding lawn mower frame; a stability support configured to extend downward and forward from the rack proximate the rearward edge and to rest upon a trailer hitch mechanism of the riding lawn mower frame, wherein the one or more support members comprise two support members respectively extending from the rack proximate opposite ends of the forward edge, wherein the coupling members are configured as mounting pins configured to form a slip fit in the recesses of the lawn mower frame, and wherein the support members are configured to be pivotably coupled to the rack such that an angle from which the one or more support members extend from the rack is adjustable.

2. The rack assembly of claim 1, wherein each of the one or more support members are configured in two selectively coupled portions such that a length of the one or more support members is adjustable.

3. The rack assembly of claim 2, wherein each of the one or more support members includes a securing member to secure the length of the one or more support members.

4. The rack assembly of claim 2, wherein the securing member includes a bolt and nut assembly.

5. The rack assembly of claim 1, wherein the stability support comprises:
two frame members configured to extend from the rearward edge of the rack; and
a cross member configured to connect ends of the two frame members opposite the rearward edge of the rack;
wherein the cross member is configured with a flat portion to rest upon the trailer hitch mechanism of the riding lawn mower frame.

6. The rack assembly of claim 5, wherein the two frame members are configured to be selectively detachable from the rack.

7. The rack assembly of claim 6, wherein the two frame members are configured to be attached to the rack by a nut and bolt assembly.

8. The rack assembly of claim 5, wherein the two frame members are configured to be pivotably coupled to the rack such that a height of the cross member is adjustable relative to the rack.

9. The rack assembly of claim 5, wherein each of the frame members are configured in two selectively coupled portions such that a length of the frame members is adjustable.

10. The rack assembly of claim 9, wherein each of the frame members includes a securing member to secure the length of the respective frame members.

11. The rack assembly of claim 10, wherein the securing member includes a bolt and nut assembly.

12. The rack assembly of claim 9, wherein each of the portions of each frame member is configured with through holes formed to register with through holes of a corresponding portion such that a preferred length of the frame member is secured by a bolt received by through holes in register.

13. The rack assembly of claim 1, further comprising a selectively detachable floor provided to the rack.

14. A rack assembly for a riding lawn mower having recesses in a frame on opposite sides of the seat and a trailer hitch mechanism, the rack assembly comprising: a rack having a substantially flat floor for carrying items, the rack having a forward edge and a rearward edge; a pair of mounting pins carried proximate opposite ends of the forward edge of the rack on support members, each of the mounting pins extending downwardly and spaced to register with and be received by a cooperating recess in the frame; and a stability support extending downwardly from the rearward edge of the rack and angled towards the forward edge thereof, the stability support terminating in a cross member that rests on the trailer hitch mechanism of the mower, wherein the support members extend from the rack proximate opposite ends of the forward edge, wherein the mounting pins are configured to form a slip fit in the recesses of the lawn mower frame, and wherein the support members are configured to be pivotably coupled to the rack such that an angle from which the one or more support members extend from the rack is adjustable.

15. The rack assembly of claim 14, wherein the stability support comprises a pair of spaced frame members, each of the frame members being connected at its upper end to the rearward edge of the rack, and each of the frame members being connected at its lower end to the cross member which rests on the trailer hitch mechanism of the mower when the rack is mounted thereon.

16. The rack assembly of claim 15, wherein each of the frame members is configured to be adjusted in its length dimension to accommodate differences between the spacing of the rearward edge of the rack and the trailer hitch mechanism.

* * * * *